United States Patent [19]

Land

[11] 3,841,879
[45] Oct. 15, 1974

[54] DIFFUSION TRANSFER PROCESSING COMPOSITION CONTAINER WITH COLLOIDAL SILICA VISCOSITY INCREASING AGENT

[75] Inventor: Edwin H. Land, Cambridge, Mass.

[73] Assignee: Polaroid Corporation, Cambridge, Mass.

[22] Filed: June 27, 1973

[21] Appl. No.: 374,253

Related U.S. Application Data

[62] Division of Ser. No. 247,025, April 24, 1972, Pat. No. 3,776,726.

[52] U.S. Cl. ............... 96/76 C, 96/66 R, 96/201, 206/84
[51] Int. Cl. ...... G03c 5/30, G03c 1/48, B65d/81/00
[58] Field of Search ...................... 96/3, 29 D, 96/77, 66 R, 76 C, 201; 106/204, 193 J, 148, 137; 206/84; 260/37 R

[56] References Cited
UNITED STATES PATENTS

| | | | |
|---|---|---|---|
| 3,265,501 | 8/1966 | Johnston | 96/66 R |
| 3,266,894 | 8/1966 | Weyerts et al. | 96/3 |
| 3,415,644 | 12/1968 | Land | 96/3 |
| 3,776,726 | 12/1973 | Land | 96/3 |

*Primary Examiner*—Ronald H. Smith
*Assistant Examiner*—Richard L. Schilling
*Attorney, Agent, or Firm*—Stanley H. Mervis

[57] ABSTRACT

Diffusion transfer process film units are disclosed which include a rupturable container releasably holding a viscous processing composition including a film-forming, viscosity-providing polymer, a light-reflecting pigment and colloidal silica. Substantially increased viscosity results from the inclusion of the colloidal silica. Color images, particularly multicolor integral negative-positive reflection prints, are obtained using the disclosed film units.

10 Claims, No Drawings

DIFFUSION TRANSFER PROCESSING COMPOSITION CONTAINER WITH COLLOIDAL SILICA VISCOSITY INCREASING AGENT

This application is a division of Ser. No. 247,025, filed Apr. 24, 1972, now U.S. Pat. No. 3,776,726, issued Dec. 4, 1973.

This invention is concerned with photography and, more particularly, with diffusion transfer photographic products and processes employing a viscous processing composition.

Diffusion transfer processes performed in photographic apparatus of the "self-developing" type advantageously utilize a viscous processing composition to provide uniform distribution of reagents and "dry" processing, i.e., to aid in conforming the processing composition between two sheet-like elements and to aid in maintaining said elements in their requisite superposed relationship during the process. The desired viscosity may be provided by dissolving an alkali-stable polymeric film-forming material in the processing composition. Particularly useful viscosity-providing, film-forming polymers comprise high molecular weight polymers such as polymeric, water-soluble cellulose ethers which are inert to an alkaline solution, e.g., a hydroxyethyl cellulose or sodium carboxymethyl cellulose as taught in U.S. Pat. No. 2,603,585 issued July 15, 1952 to Edwin H. Land. The film-forming material is preferably contained in the processing composition in such suitable quantities as to impart to the composition a viscosity in excess of 100 cps. at a temperature of approximately 24°C. and preferably in the order of 100,000 to 200,000 cps. at that temperature. The processing composition may be releasably retained in a rupturable container until needed, as disclosed in said U.S. Pat. No. 2,603,565 and in other patents, including U.S. Pat. No. 2,543,181 issued Feb. 27, 1951 to Edwin H. Land.

The present invention has as its principal object the provision of a viscous processing composition useful in diffusion transfer processes comprising a film-forming polymer and an inorganic material which increases the viscosity provided by said polymer.

A further object of this invention is to provide viscous processing compositions which are particularly adapted for use in forming integral negative-positive reflection prints by diffusion transfer processing.

Yet another object of this invention is to provide diffusion transfer film units adapted for forming color transfer images, said film units including processing compositions containing a viscosity-providing polymer and a colloidally dispersed inorganic material, more particularly a colloidal silica.

Other objects of this invention will in part be obvious and will in part appear hereinafter.

The invention accordingly comprises the features, properties and relation of components and the process involving the several steps and the relation and order of one or more of such steps with respect to each of the others which are exemplified in the following detailed disclosure, and the scope of the application of which will be indicated in the claims.

For a fuller understanding of the nature and objects of the invention, reference should be had to the following detailed description.

As indicated above, this invention is concerned with diffusion transfer processes which utilize a viscous processing composition. In such processes, a thin substantially uniform layer of a processing composition is provided between two superposed sheet-like elements. In a typical process of this type, one of said sheet-like elements contains one or more photosensitive strata and the other sheet-like contains an image-receiving stratum for receiving an imagewise distribution of image-forming components transferred by diffusion from the other or photosensitive element. In other processes, the image-receiving layer and the photosensitive layer(s) are initially present on a common support, and the second element functions as a "spreader sheet" to aid in distribution of the viscous processing composition and to confine it between said elements, the other surfaces of the superposed elements remaining dry. More recently, increased interest has occurred with respect to diffusion transfer processes wherein the developed photosensitive layer(s) and the transfer image-containing layer are maintained together as a permanent laminate; the resulting photographs may be referred to as "integral negative-positive reflection prints." In such processes a light-reflecting layer is provided between the image-receiving layer and the photosensitive layer(s) so as to mask the developed photosensitive layers and to provide a background, preferably white, against which the transfer image may be viewed. A white pigment, preferably titanium dioxide, is advantageously used to provide said light-reflecting layer and said white pigment may initially be present in the processing composition.

In the preferred embodiments of this invention, the transfer image is a dye image resulting from the use of dye developers in the development of an exposed silver halide emulsion; accordingly, the invention will be described for convenience by reference to its utilization in dye developer color transfer processes.

U.S. Pat. No. 2,983,606 issued May 9, 1961 to Howard G. Rogers, discloses the formation of diffusion transfer color images by the use of dye developers, i.e., a compound which is both a silver halide developing agent and a dye. A photosensitive element containing a dye developer and a silver halide emulsion is exposed and a viscous processing composition is distributed in a substantial uniform layer between the exposed photosensitive element and a superposed image-receiving layer. The processing composition is so applied and confined within and between the two sheet-like elements as not to contact or wet outer surfaces of the superposed elements, thus providing a film unit or film packet whose external surfaces are dry. The viscous processing composition preferably is distributed from a single-use rupturable container; such pressure rupturable processing containers are well known and are frequently referred to as "pods." The liquid processing composition, distributed intermediate the photosensitive element and the image-receiving layer, permeates the emulsion to initiate development of the latent image contained therein. The dye developer is immobilized or precipitated in exposed areas as a consequence of the development of the latent image. This immobilization is apparently, at least in part, due to a change in the solubility characteristics of the dye developer upon oxidation and especially as regards its solubility in alkaline solutions. It may also be due in part to a tanning effect on the emulsion by oxidized developing agent, and in part to a localized exhaustion of alkali as a result of development. In undeveloped and partially developed areas of the emulsion, the dye developer is unreacted and diffusible and thus provides an imagewise distribution of unoxidized dye developer, diffusible in the liquid processing composition, as a function of the point-to-point degree of exposure of the silver halide emulsion. At least part of this imagewise distribution of unoxidized dye developer is transferred, by imbibition, to a superposed image-receiving layer or element, said transfer substantially excluding oxidized dye developer. The image-receiving layer receives a depthwise diffusion, from the developed emulsion, of unoxidized dye developer without appreciably disturbing the imagewise distribution thereof to provide a reversed or positive color image of the developed image. The image-receiving element may contain agents adapted to mordant or otherwise fix the diffused, unoxidized dye developer. If the color of the transferred dye developer is affected by changes in the pH of the image-receiving element, this pH may be adjusted in accordance with well-known techniques to provide a pH affording the desired color. In the preferred embodiments of said U.S. Pat. No. 2,983,606 and in current commercial applications thereof, the desired positive image is revealed by separating the image-receiving layer from the photosensitive element at the end of a suitable imbibition period. Alternatively, as also disclosed in said U.S. Pat. No. 2,983,606, the image-receiving layer need not be separated from the photosensitive element, subsequent to transfer image formation, if the support for the image-receiving layer, as well as any other layers intermediate said support and image-receiving layer, is transparent and a processing composition containing a substance, e.g., a white pigment, effective to mask the developed silver halide emulsion or emulsions is applied between the image-receiving layer and said silver halide emulsion or emulsions.

Dye developers, as noted above, are compounds which contain, in the same molecule, both the chromophoric system of a dye and also a silver halide developing function. By "a silver halide developing function" is meant a grouping adapted to develop exposed silver halide. A preferred silver halide developing function is a hydroquinonyl group. Other suitable developing functions include ortho-dihydroxyphenyl and ortho- and para-amino substituted hydroxyphenyl groups. In general, the development function includes a benzenoid developing function, that is, an aromatic developing group which forms quinonoid or quinone substances when oxidized.

Multicolor images may be obtained using dye developers in diffusion transfer processes by several techniques. One such technique contemplates obtaining multicolor transfer images utilizing dye developers by employment of an integral multilayer photosensitive element, such as is disclosed in the aforementioned U.S. Pat. No. 2,983,606, and particularly with reference to FIG. 9 of the patent's drawing, and also in U.S. Pat. No. 3,345,163 issued Oct. 3, 1967 to Edwin H. Land and Howard G. Rogers, wherein at least two selectively sensitized photosensitive strata, superposed on a single support, are processed, simultaneously and without separation, with a single common image-receiving layer. A suitable arrangement of this type comprises a support carrying a red-sensitive silver halide emulsion stratum, a green-sensitive silver halide emulsion stratum and a blue sensitive silver halide emulsion stratum, said emulsions having associated therewith, respectively, for example, a cyan dye developer, a magenta dye developer and a yellow dye developer. Each set of silver halide emulsion and associated dye developer strata may be optionally separated from other sets by suitable interlayers, for example, by a layer or stratum of gelatin or polyvinyl alcohol. In certain instances, it may be desirable to incorporate a yellow filter in front of the green-sensitive emulsion and such yellow filter may be incorporated in an interlayer. However, where desirable, a yellow dye developer of the appropriate spectral characteristics and present in a state capable of functioning as a yellow filter may be so employed and a separate yellow filter omitted.

The dye developers are preferably selected for their ability to provide colors that are useful in carrying out subtractive color photography, that is, the previously mentioned cyan, magenta and yellow. The dye developers employed may be incorporated in the respective silver halide emulsion or, in the preferred embodiment, in a separate layer behind the respective silver halide emulsion applied by use of a coating solution containing the respective dye developer in a concentration calculated to give the desired coverage of dye developer per unit area, in a film-forming natural, or synthetic, polymer, for example, gelatin, polyvinyl alcohol, and the like, adapted to be permeated by the diffusion transfer processing composition.

As examples of materials for use as the image-receiving layer, mention may be made of partially hydrolyzed polyvinyl acetate; polyvinyl alcohol; gelatin; and other materials of a similar nature. Preferred materials comprise polyvinyl alcohol or gelatin containing a dye mordant such as poly-4-vinylpyridine, as disclosed in U.S. Pat. No. 3,148,061, issued Sept. 8, 1964 to Howard C. Haas.

U.S. Pat. Nos. 3,415,644, 3,415,645 and 3,415,646, all issued Dec. 10, 1968 in the name of Edwin H. Land, disclose and claim photographic products and processes wherein a photosensitive element and an image-receiving element are maintained in fixed relationship prior to and during exposure, and this relationship is maintained as a laminate after processing and image formation to provide an integral negative-positive reflection print. In these processes, the final image is viewed through a transparent (support) element against a light-reflecting, i.e., white background. In a particularly useful embodiment, photoexposure is made through said transparent support and application of the processing composition provides a layer of light-reflecting material to provide a white background. The light-reflecting material (referred to in said patents and applications as an "opacifying agent") is preferably titanium dioxide, and it also performs an opacifying function, i.e., it is effective to mask the developed silver halide emulsions so that the transfer image may be viewed without interference therefrom, and it also helps to protect the photoexposed silver halide emulsions from post-exposure fogging by light passing through said transparent layer if the photoexposed film unit is removed from the camera before image-formation is completed.

U.S. Pat. No. 3,647,437 issued Mar. 7, 1972 to Edwin H. Land, is concerned with improvements in the above-mentioned processes, and discloses the provision of light-absorbing materials to permit such processes to be performed outside of the camera in which photoexposure is effected and under much more intense ambient light conditions. A light-absorbing material or reagent, preferably a dye, is provided so positioned and/or constituted as not to interfere with photoexposure but so positioned between the photoexposed silver halide emulsions and the transparent support during processing after photoexposure as to absorb light which otherwise might fog the photoexposed emulsions. The light-absorbing material is so positioned and/or constituted after processing as not to interfere with viewing the desired image shortly after said image has been formed. In the preferred embodiments, the light-absorbing material, also sometimes referred to as an optical filter agent, is initially contained in the processing composition together with a light-reflecting material, e.g., titanium dioxide. The concentration of the light-absorbing dye is selected to provide the light transmission opacity required to perform the particular process under the selected light conditions.

In a particularly useful embodiment, the light-absorbing dye is highly colored at the pH of the processing composition, e.g., 13–14, but is substantially non-absorbing of visible light at a lower pH, e.g., less than 10–12. This pH reduction may be effected by an acid-reacting reagent appropriately positioned in the film unit, e.g., in a layer between the transparent support and the image-receiving layer.

As disclosed in the previously cited patents, the liquid processing composition referred to for effecting multicolor diffusion transfer processes comprises at least an aqueous solution of an alkaline material, for example, sodium hydroxide, potassium hydroxide, and the like, and preferably processing a pH in excess of 12, and most preferably includes a viscosity-increasing compound constituting a film-forming material of the type which, when the composition is spread and dried, forms a relatively firm and relatively stable film. The preferred film-forming materials disclosed comprise high molecular weight polymers such as polymeric, water-soluble ethers such as polymeric, water-soluble ethers which are inert to an alkaline solution such as, for example, a hydroxyethyl cellulose or sodium carboxymethyl cellulose. Other film-forming polymers whose ability to increase viscosity is substantially unaffected if left in alkaline solution for a long period of time are also capable of utilization. As stated, the film-forming polymer is preferably contained in the processing composition in such suitable quantities as to impart to the composition a viscosity in excess of 100 cps. at a temperature of approximately 24°C. and preferably in the order of 100,000 cps. to 200,000 cps. at that temperature.

As is known and recognized in the art, some film-forming, viscosity-providing polymers, particularly cellulose ethers such as carboxymethyl cellulose, are soluble in water only in the form of a salt thereof, e.g., an alkali metal or ammonium yalt. The use of such water-soluble salts is to be understood as within the scope of the term water-soluble polymer as used herein.

It has now been found that the incorporation of colloidal silica in such viscous processing compositions provides a marked increase in viscosity and improved photographic properties, particularly when employed in diffusion transfer processes providing integral negative-positive reflection prints.

Colloidal silica as used herein is intended to refer to aqueous sols of widely dispersed discrete particles which are essentially amorphous silica ($SiO_2$). 95 percent or more of the solid content of such sols is $SiO_2$. The silica particles are extremely small, being on the order of 15 millimicrons or smaller. The silica particles may have a small quantity of sodium ions on the surface to prevent agglomeration. Particularly useful colloidal silicas are the sols of colloidal silica commercially available of E. I. du Pont de Nemours Co., Wilmington, Delaware, under the tradename "Ludox" colloidal silica. These sols contain about 30 percent by weight silica and have viscosities of less than 15 cps. at 25°C.

It has been found that the addition of colloidal silica to processing compositions containing water-soluble cellulose ethers, such as sodium carboxymethyl cellulose, (CMC) hydroxyethyl cellulose (HEC) and hydroxyethyl carboxymethyl cellulose sodium salt (HECMC), markedly increases the viscosity of the processing composition. Viscosity increases of as much as two to five times the viscosity provided by the cellulose ether alone may be readily obtained without reducing the utility of the processing composition in diffusion transfer processes. The resulting viscous processing compositions exhibit improved thiotropic properties, with increased resistance to flow when at rest and readily flowing when subjected to pressure.

When used in forming integral negative-positive reflection prints, the incorporation of colloidal silica in the processing composition may provide bond strength to the resulting laminate. When the applied layer of the processing composition solidifies by extraction of the water and drying, the mixture of colloidal silica and polymer appears to aid in preventing further transfer of reagents, including image dyes, to the image-receiving layer. The polymer-colloidal silica viscous processing compositions of this invention increase the dispersion stability of light-reflecting pigments, e.g., titanium dioxide, incorporated therein. Where the components of the integral negative-positive film unit used to provide an integral negative-positive film unit are temporarily laminated together prior to exposure, as by a layer of water-soluble polyethylene glycol, distribution of the processing composition being used to delaminate and then relaminate to form the final laminate, the polymer-colloidal silica viscous processing compositions provide a "cleaner" delamination with more uniform coverage, i.e., the polyethylene glycol layer is more uniformly separated. In addition, the marked increases in viscosity provided by the colloidal silica permits the use of less of the polymeric viscosity-providing agent.

The amount of colloidal silica to be added to the processing composition may be readily determined as a function of the viscosity and other properties desired for the particular diffusion transfer process. It has been found that useful processing compositions may be obtained by using a cellulose ether to colloidal silica (as $SiO_2$) of from about 4 to 1 to about 1 to 2, a ratio of 2 to 1 being particularly useful. This ratio will vary in part as a result of the polymer's own viscosity. The higher the colloidal silica content, the higher the viscosity will be.

The following example is given for purposes of illustration only:

EXAMPLE

A photosensitive element was prepared by coating a gelatin-subcoated 4 mil opaque polyethylene terephthalate film base with the following layers:

1. a layer of cyan dye developer dispersed in gelatin and coated at a coverage of about 100 mgs./ft.² of dye and about 80 mgs./ft.² of gelatin;
2. a red-sensitive gelatino silver iodobromide emulsion coated at a coverage of about 140 mgs./ft.² of silver and about 70 mgs./ft.² of gelatin;
3. a layer of a 60-30-4-6 copolymer of butylacrylate, diacetone acrylamide, styrene and methacrylic acid and polyacrylamide coated at a coverage of about 150 mgs./ft.² of the copolymer and about 5 mgs./ft.² of polyacrylamide;
4. a layer of magenta dye developer dispersed in gelatin and coated at a coverage of about 112 mgs./ft.² of dye and about 100 mgs./ft.² of gelatin;
5. a green-sensitive gelatino silver iodobromide emulsion coated at a coverage of about 100 mgs./ft.² of silver and about 50 mgs./ft.² of gelatin;
6. a layer containing the copolymer referred to above in layer 3 and polyacrylamide coated at a coverage of about 100 mgs./ft.² of copolymer and about 12 mgs.ft.² of polyacrylamide;
7. a layer of yellow dye developer dispersed in gelatin and coated at a coverage of about 70 mgs./ft.² of dye and about 56 mgs./ft.² of gelatin;
8. a blue-sensitive gelatino silver iodobromide emulsion layer including the auxiliary developer 4'-methylphenyl hydroquinone coated at a coverage of about 120 mgs./ft.² of silver, about 60 mgs./ft.² of gelatin and about 30 mgs./ft.² of auxiliary developer; and
9. a layer of gelatin coated at a coverage of about 50 mgs./ft.² of gelatin. (The three dye developers employed were the ones recited above.)

A transparent 4 mil. polyethylene teraphthalate film base was coated, in succession, with the following layers to form an image-receiving component:

1. as a polymeric acid layer, the partially butyl ester of polyethylene/maleic anhydride copolymer at a coverage of about 2,500 mgs./ft.²;
2. a timing layer containing about a 40:1 ratio of a 60-30-4-6 copolymer of butylacrylate, diacetone acrylamide, styrene and methacrylic acid and polyacrylamide at a coverage of about 500 mgs./ft.²; and
3. a polymeric image-receiving layer containing a 2:1 mixture, by weight, of polyvinyl alcohol and poly-4-vinylpyridine, at a coverage of about 300 mgs./ft.². The two components thus prepared were then taped together, in laminate form, at their respective edges to provide an integral film unit, with a rupturable container retaining an aqueous alkaline processing solution fixedly mounted on the leading edge of each of the components, by pressure-sensitive tapes, so that, upon application of compressive pressure to the container to rupture the container's marginal seal, its contents were distributed in a layer approximately 0.0026 inch thick between the image-receiving layer and the gelatin overcoat layer of the photosensitive component. The aqueous alkaline processing composition comprised:

| | | |
|---|---|---|
| Potassium hydroxide (85%) | 5.3 | g. |
| N-benzyl-α-picolinium bromide (50% solution in water) | 1.3 | g. |
| N-phenethyl-α-picolinium bromide | 0.775 | g. |
| Sodium carboxymethyl cellulose (Hercules Type 7H4F providing a viscosity of 3000 cps. at 1% in water at 25°C.) | 0.59 | g. |
| Titanium dioxide | 44.9 | g. |
| 6-methyl uracil | 0.63 | g. |
| bis-(β-aminoethyl)-sulfide | 0.045 | g. |
| Lithium nitrate | 0.1 | g. |
| Benzotriazole | 0.6 | g. |
| 6-methyl-5-bromo 4-azabenzimidazole | 0.03 | g. |
| Colloidal silica aqueous dispersion (30% SiO₂) | 1.96 | g. |
| Lithium hydroxide | 0.2 | g. |
| 6-benzylamino-purine | 0.42 | g. |
| Polyethylene glycol (molecular weight 6000) | 0.58 | g. |

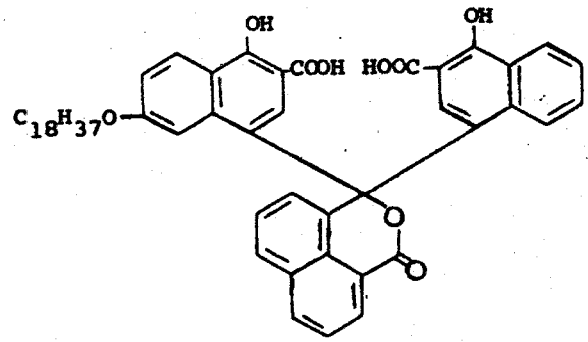

3.1 g.

Water to make 100 g.

The dye developers used were:

cyan:

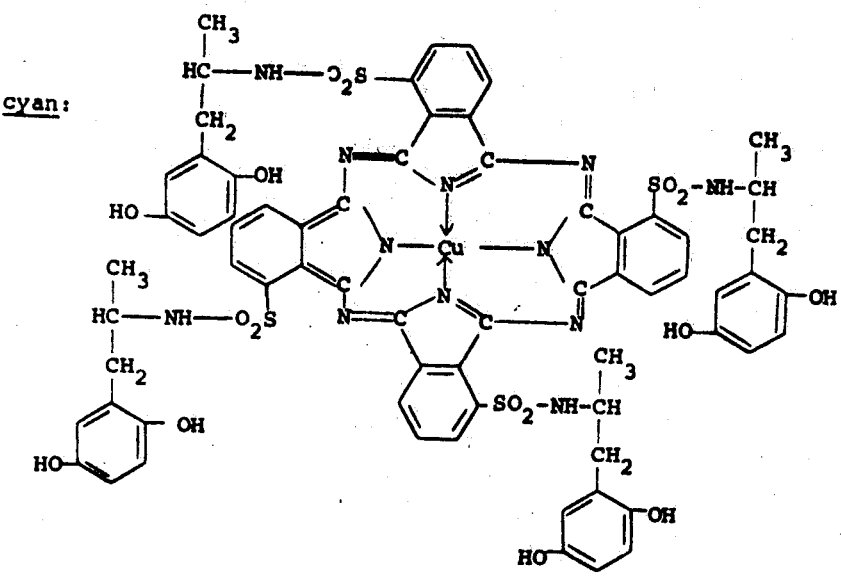

magenta:

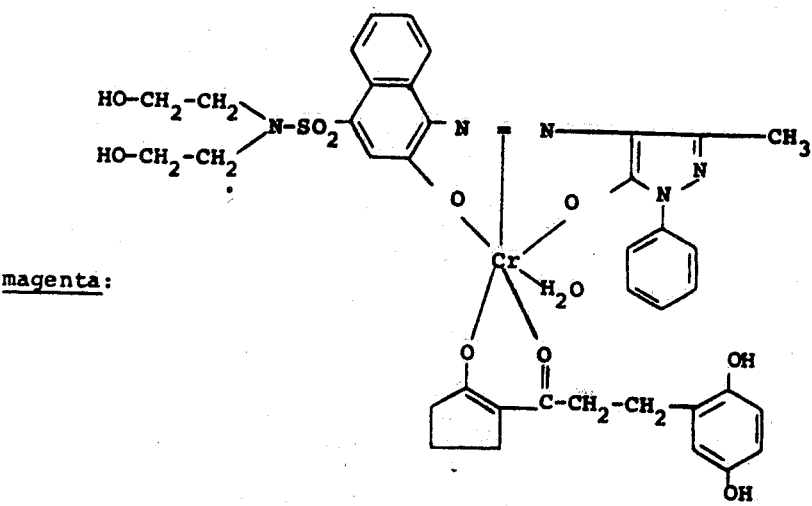

yellow:

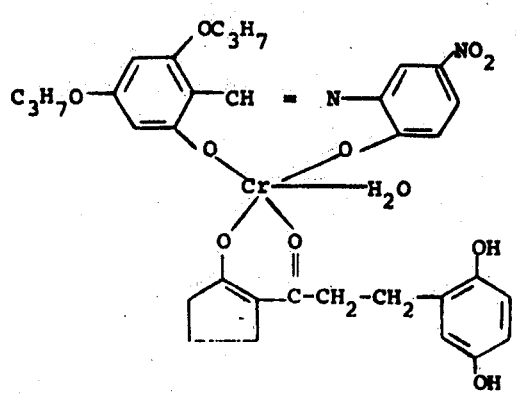

The photosensitive element was exposed through the transparent support and the layers thereon, the processing composition distributed by passing the film unit between a pair of pressure-applying rolls and into a lighted area. The laminate obtained by distribution of the processing composition was maintained intact to provide an integral negative-positive reflection print which exhibited good color quality and separation. In preparing the above processing composition, the polymer and the titanium dioxide were blended dry and then added to a solution containing all of the other reagents except the colloidal silica which was added last. The viscosity of the resulting viscous processing composition 24 hours after mixing was several times that of a control which did not include the colloidal silica.

The novel processing compositions of the present invention may be used in a variety of film structures adapted to provide integral negative-positive reflection prints, many of which are described in detail in the previously cited U.S. patents, e.g., U.S. Pat. Nos. 2,983,606; 3,415,644; 3,415,645; 3,415,646 and 3,647,437. Other useful integral negative-positive film units are described in U.S. Pat. Nos. 3,594,164 and 3,594,165 issued July 20, 1971 to Howard G. Rogers. For convenience, the disclosures of these patents are hereby incorporated by reference.

The image dye-providing materials which may be employed in such processes generally may be characterized as either (1) initially soluble or diffusible in the processing composition but are selectively rendered non-diffusible in an imagewise pattern as a function of development; or (2) initially insoluble or non-diffusible in the processing composition but which are selectively rendered diffusible or provide a diffusible product in an imagewise pattern as a function of development. These materials may be complete dyes or dye intermediates, e.g., color couplers. The requisite differential in mobility or solubility may, for example, be obtained by a chemical action such as a redox reaction or a coupling reaction.

As examples of initially soluble or diffusible materials and their application in color diffusion transfer, mention may be made of those disclosed, for example, in U.S. Pat. Nos. 2,774,668; 2,968,554; 2,983,606; 2,087,817; 3,185,567; 3,230,082; 3,345,163; and 3,443,943. As examples of initially non-diffusible materials and their use in color transfer systems, mention may be made of the materials and systems disclosed in U.S. Pat. Nos. 3,185,567; 3,443,939; 3,443,940; 3,227,550; and 3,227,552. Both types of image-dye providing substances and film units useful therewith also are discussed in the aforementioned U.S. Pat. No. 3,647,437 to which reference may be made.

In any of these systems, multicolor images are obtained by employing a film unit containing at least two selectively sensitized silver halide layers each having associated therewith an image dye-providing material exhibiting desired spectral absorption characteristics. The most commonly employed elements of this type are the so-called tripack structures employing a blue-, a green- and a red-sensitive silver halide layer having associated therewith, respectively, a yellow, a magenta and a cyan image dye-providing material, as disclosed in U.S. Pat. No. 3,345,163 issued Oct. 3, 1967 to Edwin H. Land and Howard G. Rogers. Alternatively, the silver halide emulsions may be present in the form of minute elements arranged in side-by-side relationship in a photosensitive screen pattern as is well known and taught, for example, in the aforementioned U.S. Pat. No. 2,983,606.

The image-receiving layer may comprise one of the materials known in the art, such as polyvinyl alcohol, gelatin, etc. It may contain agents adapted to mordant or otherwise fix the transferred image dye(s). Preferred materials comprise polyvinyl alcohol or gelatin containing a dye mordant such as poly-4-vinylpyridine, as disclosed in U.S. Pat. No. 3,148,061, issued Sept. 8, 1964 to Howard G. Haas. If the color of the transferred image dye(s) is affected by changes in pH, the pH of the image layer may be adjusted to provide a pH affording the desired color.

In the various color diffusion transfer systems which have previously been described and which employ an aqueous alkaline processing fluid, it is well known to employ an acid-reacting reagent in a layer of the film unit to lower the environmental pH following substantial dye transfer in order to increase the image stability and/or to adjust the pH from the first pH at which the image dyes are diffusible to a second (lower) pH at which they are not. For example, the previously mentioned U.S. Pat. No. 3,415,644 discloses systems wherein the desired pH reduction may be effected by providing a polymeric acid layer adjacent the dyeable stratum. These polymeric acids may be polymers which contain acid groups, e.g., carboxylic acid and sulfonic acid groups, which are capable of forming salts with alkali metals or with organic bases; or potentially acid-yielding groups such as anhydrides or lactones. Preferably the acid polymer contains free carboxyl groups. Alternatively, the acid-reacting reagent may be in a layer adjacent the silver halide most distant from the image-receiving layer, as disclosed in U.S. Pat. No. 3,573,043 issued Mar. 30, 1971 to Edwin H. Land. Another system for providing an acid-reacting reagent is disclosed in U.S. Pat. No. 3,576,625 issued Apr. 27, 1971 to Edwin H. Land.

An inert interlayer or spacer layer may be and is preferably disposed between the polymeric acid layer and the dyeable stratum in order to control or "time" the pH reduction so that it is not premature or interfere with the development process. Suitable spacer or "timer" layers for this purpose are described with particularity in U.S. Pat. Nos. 3,362,819; 3,419,389; 3,421,893; 3,455,686; and 3,575,701.

While the acid layer and associated spacer layer are preferably contained in the positive component employed in systems wherein the dyeable stratum and photosensitive strata are contained on separate supports, e.g., between the support for the receiving element and the dyeable stratum; or associated with the dyeable stratum in those integral film units, e.g., on the side of the dyeable stratum opposed from the negative components, they may, if desired, be associated with the photosensitive strata, as is disclosed, for example, in U.S. Pat. Nos. 3,362,821 and 3,573,043. In film units such as those described in the aforementioned U.S. Pat. Nos. 3,594,164 and 3,594,165, they also may be contained on the spreader sheet employed to facilitate application of the processing fluid.

The incorporation of colloidal silica in a viscous processing composition in color transfer processes in accordance with this invention may be readily distinguished from the prior disclosure of U.S. Pat. No. 2,616,807 issued Nov. 4, 1952 to Edwin H. Land. That patent is directed to the formation of diffusion transfer images in a layer provided by the viscous processing composition and more specifically to imparting a matte finish to the resulting image. A plurality of finely comminuted substances are disclosed as suitable for providing a matte surface to a silver transfer image layer formed by solidification of a layer of processing composition, including such diverse substances as wood flour, silica aerogel, kieselguhr, etc. The silver transfer image is formed in the layer containing the finely comminuted substance or in a layer visible therethrough. In contrast, in the present invention the solidified layer of processing composition containing colloidal silica does not contain the transfer image nor is the transfer image viewed therethrough. In the preferred embodiments of this invention, the solidified layer of polymer and colloidal silica includes a white pigment, e.g., titanium dioxide, and provides a light-reflecting layer serving as a background against which a dye transfer image is viewed. In other embodiments of this invention, the processing composition layer containing colloidal silica may be physically separated from the image-receiving layer containing the desired color transfer image.

It will be understood that dye transfer images which are neutral or black-and-white instead of multicolor may be obtained by use of a mixture of dyes of the appropriate colors, the transfer of which may be controlled by a single layer of silver halide, in accordance with known techniques. It is also to be understood that "direct positive" silver halide emulsions may also be used, depending upon the particular dye image-providing substances employed and whether a positive or negative color transfer image is desired.

Since certain changes may be made in the above product and process without departing from the scope of the invention herein involved, it is intended that all matter contained in the above description shall be interpreted as illustrative and not in a limiting sense.

What is claimed is:

1. A rupturable container for use in diffusion transfer film units adapted to provide color transfer images viewable by reflected light, said rupturable container releasably holding an aqueous alkaline processing composition comprising a water-soluble, film-forming polymer, a light-reflecting pigment and colloidal silica.

2. A rupturable container as defined in claim 1 wherein said polymer is a cellulose ether.

3. A rupturable container as defined in claim 2 wherein said cellulose ether is sodium carboxymethyl cellulose.

4. A rupturable container as defined in claim 1 wherein said pigment is titanium dioxide.

5. A rupturable container as defined in claim 1 wherein said polymer and said colloidal silica are present in said processing composition in a ratio of from about 4 to 1 to about 1 to 2.

6. A rupturable container as defined in claim 1 wherein said polymer and said colloidal silica are present in said processing composition in a ratio of about 2 to 1.

7. A rupturable container as defined in claim 1 wherein the individual particles of silica are about 15 millimicrons in size.

8. A rupturable container as defined in claim 1 wherein said processing composition includes an optical filter agent which is colored at the pH of said processing composition, said optical filter agent being adapted to be rendered colorless by reducing said pH.

9. A rupturable container as defined in claim 2 wherein said cellulose ether is hydroxyethyl cellulose.

10. A rupturable container as defined in claim 2 wherein said cellulose ether is hydroxyethyl carboxymethyl cellulose sodium salt.

* * * * *